US012786804B2

(12) United States Patent
Liu et al.

(10) Patent No.: US 12,786,804 B2
(45) Date of Patent: Nov. 3, 2026

(54) LOSSLESS MULTICAST AND BROADCAST DATA TRANSMISSIONS IN HANDOVERS

(71) Applicant: ZTE Corporation, Shenzhen (CN)

(72) Inventors: Yansheng Liu, Shenzhen (CN); Zijiang Ma, Shenzhen (CN); Yin Gao, Shenzhen (CN)

(73) Assignee: ZTE Corporation, Shenzhen (CN)

(*) Notice: Subject to any disclaimer, the term of this patent is extended or adjusted under 35 U.S.C. 154(b) by 320 days.

(21) Appl. No.: 18/606,537

(22) Filed: Mar. 15, 2024

(65) Prior Publication Data

US 2024/0224126 A1 Jul. 4, 2024

Related U.S. Application Data

(63) Continuation of application No. PCT/CN2021/125658, filed on Oct. 22, 2021.

(51) Int. Cl.
*H04W 36/00* (2009.01)

(52) U.S. Cl.
CPC ................................ *H04W 36/0007* (2018.08)

(58) Field of Classification Search
CPC . H04W 36/0007; H04W 76/11; H04W 76/12; H04W 36/0064; H04W 36/023; H04W 76/40; H04W 4/06
See application file for complete search history.

(56) References Cited

U.S. PATENT DOCUMENTS

| | | | | |
|---|---|---|---|---|
| 11,751,100 | B2 * | 9/2023 | Mao | H04L 45/24 370/329 |
| 12,132,680 | B2 * | 10/2024 | Kundu | H04L 27/0006 |
| 12,137,462 | B2 * | 11/2024 | Lee | H04L 1/08 |
| 12,200,472 | B2 * | 1/2025 | Ali | H04L 41/0806 |
| 2021/0058970 | A1 * | 2/2021 | Kwak | H04L 1/08 |
| 2021/0105196 | A1 * | 4/2021 | Dao | H04L 47/24 |
| 2021/0410037 | A1 * | 12/2021 | Tsai | H04W 36/087 |

(Continued)

FOREIGN PATENT DOCUMENTS

| | | | |
|---|---|---|---|
| CN | 112511989 | A | 3/2021 |
| WO | 2021109474 | A1 | 6/2021 |
| WO | 2021207114 | A1 | 10/2021 |

OTHER PUBLICATIONS

International Search Report and Written Opinion for International Application No. PCT/CN2021/125658, mailed on May 30, 2023, 10 pages.

(Continued)

*Primary Examiner* — Jay P Patel

(74) *Attorney, Agent, or Firm* — Ashurst Perkins Coie US LLP

(57) ABSTRACT

Methods, apparatus, and systems that enable lossless Multicast and Broadcast Service (MBS) data transmissions in various handovers scenarios are disclosed. In one example aspect, a wireless communication method includes receiving, by a first network node, a request message from a second network node comprising information for establishing a multicast and broadcast service (MBS) session. The method includes establishing a buffer associated with the MBS session by the first network node based on a requirement of the buffer, and transmitting, by the first network node, a response message to the second network node in response to the request message.

18 Claims, 14 Drawing Sheets

(56) References Cited

U.S. PATENT DOCUMENTS

| | | | | |
|---|---|---|---|---|
| 2022/0078683 | A1* | 3/2022 | Eklöf | H04W 36/362 |
| 2023/0009565 | A1* | 1/2023 | Gan | H04L 1/1642 |
| 2023/0012998 | A1* | 1/2023 | Xu | H04W 36/0064 |
| 2023/0089834 | A1* | 3/2023 | Xiong | H04W 36/08 370/331 |
| 2023/0262532 | A1* | 8/2023 | Chen | H04W 4/06 370/312 |
| 2024/0057218 | A1* | 2/2024 | Zhang | H04L 1/1685 |
| 2024/0090078 | A1* | 3/2024 | Godin | H04W 36/0007 |
| 2024/0323959 | A1* | 9/2024 | Sengupta | H04W 4/06 |
| 2025/0392966 | A1* | 12/2025 | Schliwa-Bertling | H04W 36/0007 |

OTHER PUBLICATIONS

Ericsson, "Mobility for NR MBS," 3GPP TSG RAN WG2 #112e, Electronic meeting, R2-2009960, Nov. 2-13, 2020, 5 pages.
CATT et al., "Consideration on Flow Control Mechanism over F1-U," 3GPP TSG-RAN WG3 #113 electronic, R3-213544, Online, Aug. 16-26, 2021 (7 pages).
ZTE, "Discussion on lossless mobility in NR MBS," 3GPP TSG-RAN WG3 #112-e, R3-211547, May 17-27, 2021 (12 pages).
Samsung (Moderator), "Summary of Offline Discussion on CB:# 75_MBS_Mobility_Supporting," 3GPP TSG-RAN WG3 #111-e, R3-211031, Online, Jan. 25-Feb. 4, 2021 (13 pages).
Extended European Search Report for European Patent Application No. 21961043.3, mailed Oct. 7, 2024 (13 pages).

* cited by examiner

LOSSLESS MULTICAST AND BROADCAST DATA TRANSMISSIONS IN HANDOVERS

CROSS REFERENCE TO RELATED APPLICATIONS

This patent document is a continuation of and claims benefit of priority to International Patent Application No. PCT/CN2021/125658, filed on Oct. 22, 2021. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that enable lossless Multicast and Broadcast Service (MBS) data transmissions in various handover scenarios.

In one example aspect, a method for wireless communications includes receiving, by a first network node, a request message from a second network node comprising information for establishing an MBS session. The method includes establishing a buffer associated with the MBS session by the first network node based on a requirement of the buffer, and transmitting, by the first network node, a response message to the second network node in response to the request message. The response message comprises information about the established buffer.

In another example aspect, a method for wireless communications includes transmitting, from a first access node, a first message to a second access node indicating information associated with an MBS session. The first access node is configured to store a first set of MBS data packets received from a core network in a first buffer, and the second access node is configured to store a second set of MBS data packets received from the core network in a second buffer. The first message includes information of a last MBS data packet received and stored by the first access node. The method includes receiving, by the first access node, a second message from the second access node. The second message includes information of a last MBS data packet received and stored by the second access node. The method also includes forwarding, by the first access node, at least part of the first set of MBS data packets stored in the first buffer to the second access node.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Multicast/Broadcast Service (MBS) is a concept that network resources are used to send the same multimedia content to everyone (e.g., broadcasting) or to a group of subscribers (e.g., multicasting) rather than sending content to individual subscribers. With the development of the 5G New Radio (NR) technology, MBS has become one of the key aspects for Internet of Things (IoT) and Vehicle to Everything (V2X) communications.

Figure 1:
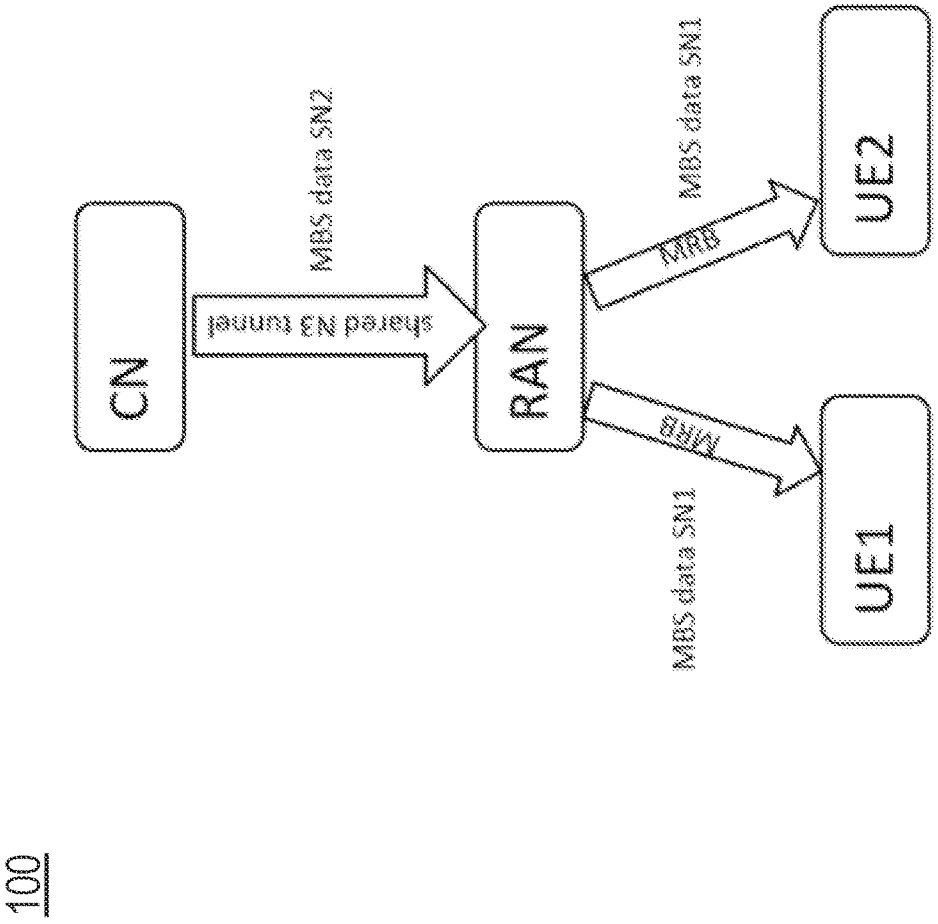
FIG. 1 (Prior Art)
FIG. 1 illustrates an example data flow for MBS data transmissions.

To improve transmission efficiency of the MBS data, it has been proposed to transport the MBS data packets from the Core Network (CN) to the access node (New-Generation Radio Access Node, NG-RAN) using a shared N3 tunnel instead of a unicast channel. The shared N3 tunnel is a tunnel that is defined for MBS use only. FIG. 1 illustrates an example data flow for MBS data transmissions. The CN transmits MBS data packets to the NG-RAN using the shared N3 tunnel. The NG-RAN then forwards the MBS data packets to the UEs (e.g., UE1, UE2) via the Multicast Radio Bearer (MRBs). Currently, the NG-RAN does not buffer or store the received MBS data packets temporarily—all the MBS data packets are forwarded directly to the UEs. However, when a UE is handed over from one NG-RAN to another, data packets may be lost during the handover process as the source NG-RAN and the target NG-RAN may not transmit the MBS packets in the correct order due to latency in the network.

This patent document discloses techniques that can be implemented in various embodiments to ensure lossless MBS data transfers in various handover scenarios. In particular, a buffer can be constructed or established for each MBS session at the access node to temporarily store each received MBS data packet so as to maintain the MBS data continuity and ensure lossless MBS data during UE handovers from the source node to other nodes.

Figure 2:
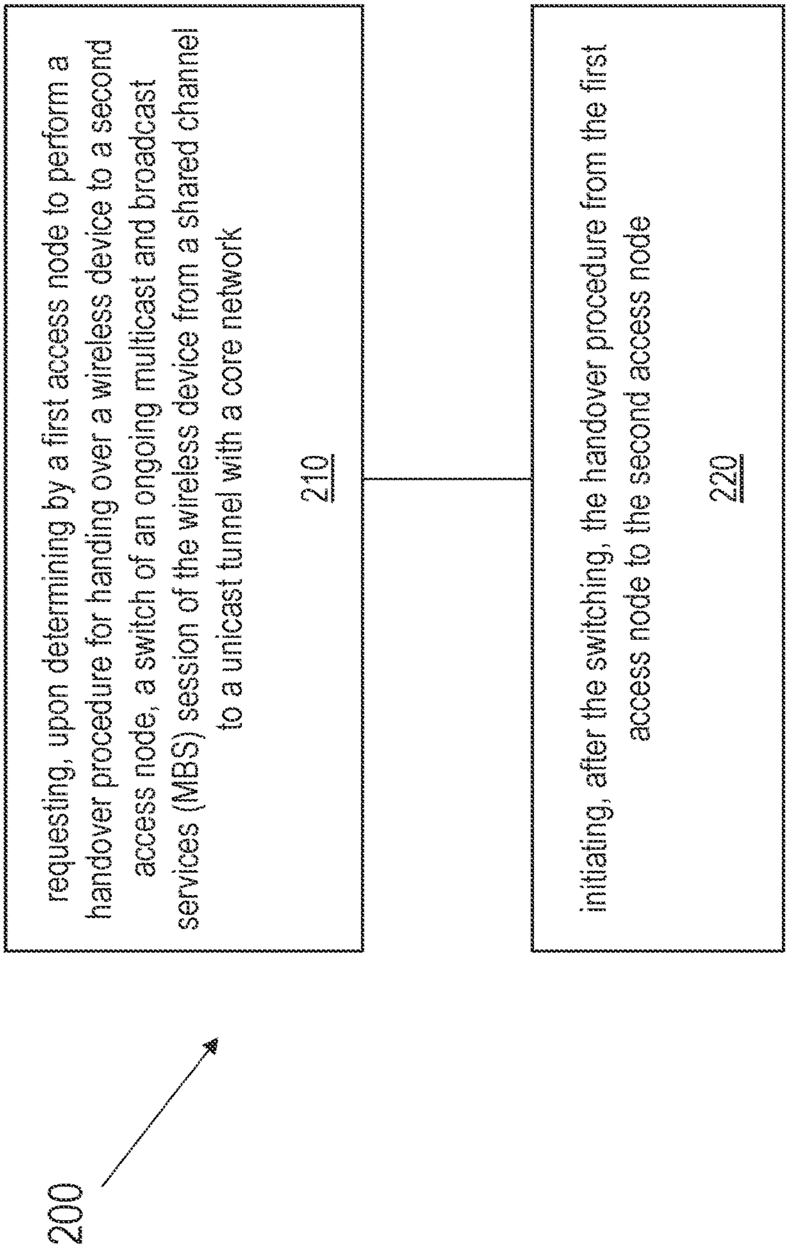
FIG. 2 is a flowchart representation of a method for wireless communications in accordance with one or more embodiments of the present technology.

FIG. 2 is a flowchart representation of a method 200 for wireless communications in accordance with one or more embodiments of the present technology. A first set of preferred solutions may include the following (e.g., as described with reference to Embodiments 1 to 3).

The method 200 includes, at operation 210, receiving, by a first network node, a request message from a second network node comprising information for establishing a multicast and broadcast service (MBS) session. In some embodiments, the first network node is an access node, and the second network node is a node in a core network. In some embodiments, the first network node comprises a centralized unit (CU) user plane (CP) function, and the second network node comprises a CU control plane (UP) function. The method 200 includes, at operation 220, establishing a buffer associated with the MBS session by the first network node based on a requirement of the buffer. For example, the buffer can be established accordingly to the information included in the request message. Alternatively, or in addition, the buffer can be established using the information as a reference or guidance. The method 200 also includes, at operation 230, transmitting, by the first network node, a response message to the second network node in response to the request message, wherein the response message comprises information about the established buffer.

In some embodiments, the request message includes the requirement of the buffer associated with the MBS session. In some embodiments, the request message comprises at least an identifier of the MBS session or a priority of the MBS session. In some embodiments, the requirement for the buffer indicates one or more of: (1) a size limitation of the buffer, (2) a number of MBS data packets storable in the buffer, and/or (3) a periodicity associated with storing MBS data packets.

In some embodiments, the information about the established buffer includes acknowledgement indicating establishment of the buffer. In some embodiments, the information about the established buffer includes one or more parameters of the established buffer.

Some examples of the disclosed techniques are further described in the following example embodiments.

Embodiment 1

Figure 3:
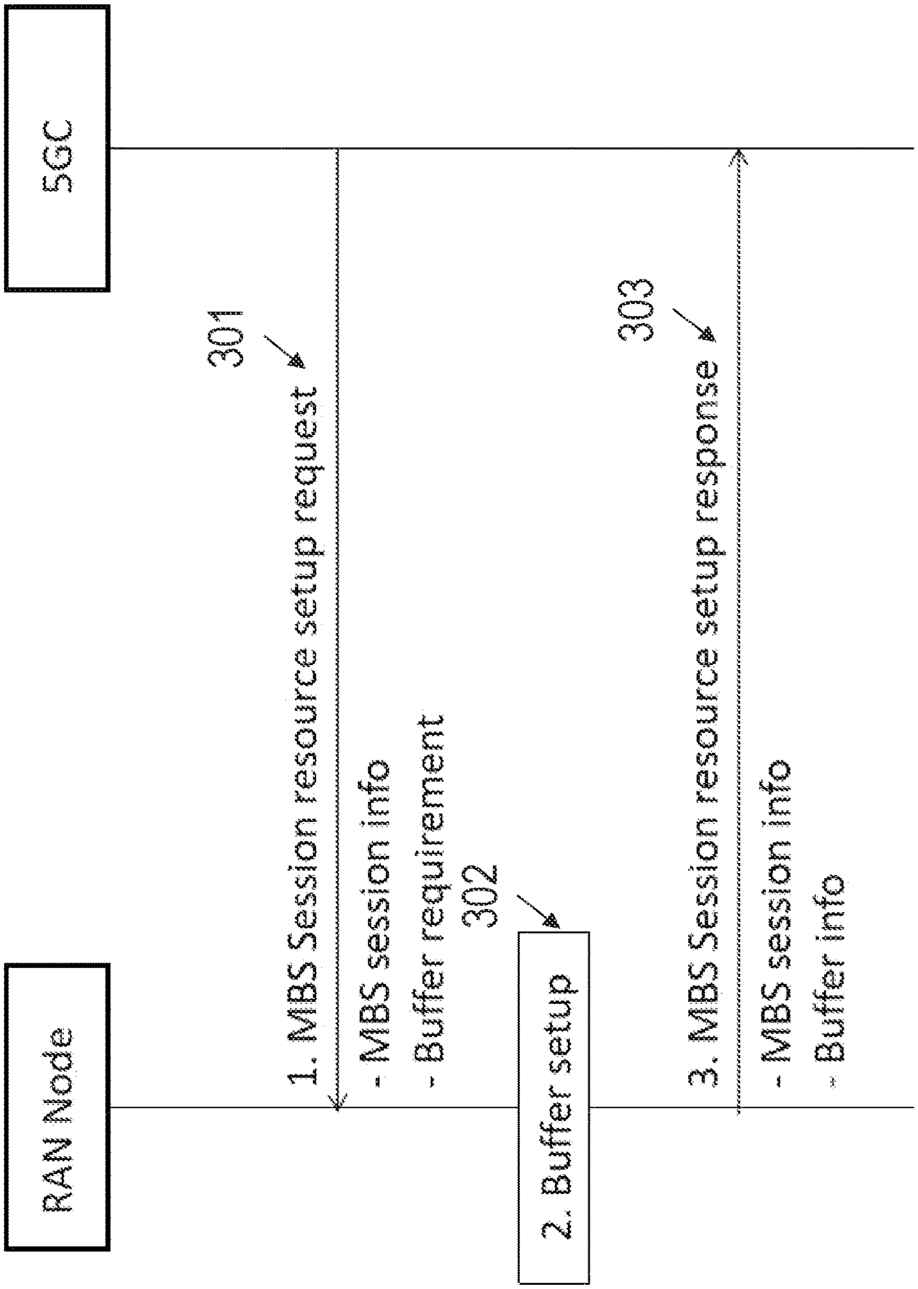
FIG. 3 is an example sequence chart of signaling messages between a Radio Access Node (RAN) and the core network (CN) in accordance with one or more embodiments of the present technology.

In some embodiments, the CN can configure the MBS buffer that is to be established by the RAN. FIG. 3 is an example sequence chart of signaling messages between a RAN node and the core network (e.g., 5G Core, 5GC) in accordance with one or more embodiments of the present technology.

Operation 301: During the MBS session establishment procedure, 5GC transmits a message (e.g., MBS Session Resource Setup Request message) to the RAN node. The message can include one or more of the following parameters for the buffer: MBS session information (such as MBS session identifier (ID) and/or MBS priority) and/or buffer requirements (such as a size limitation of the buffer, a number of MBS data packets that can be stored in the buffer, and/or a periodicity associated with storing MBS data packets).

Operation 302: The RAN node uses the received buffer parameters and establish a buffer for the MBS session based on the received parameters. In some embodiments, the RAN node constructs a buffer according to the received parameters so as to completely fulfills the requirements provided by the CN. In some embodiments, the RAN node constructs the buffer using the received parameters as a reference and makes its own determination regarding the parameters of the buffer to be established.

Operation 303: The RAN node transmits a response message (e.g., MBS Session resource setup response message) to the 5GC. The response message can include the MBS session information (e.g., MBS session ID) as well as the actual parameters for the established buffer. The response message can also include an indicator indicating that the buffer setup has completed successfully.

Embodiment 2

As shown in FIG. 3, during the MBS session establishment, the RAN node can establish a buffer for the corresponding MBS session. The parameters of the buffer can be configured by the CN (e.g., 5GC) or other network nodes such as the Operation, Administration and Maintenance (OAM). The parameters of the buffer can be partially or fully determined by the RAN node based on its implementation and/or configurations from the CN or other nodes.

In some embodiments, different MBS sessions can be allocated different resources for its buffer. For example, for a first MBS session with a higher priority, the RAN node can allocate more resources for the first MBS session. For a second MBS session with a lower priority, the RAN node can allocate fewer resources for the second MBS session. Alternatively, or in addition, different NG-RAN nodes can allocate different buffer resources for the same MBS session.

The buffer parameters specify some limitations of the MBS buffer at the RAN side. For example, the parameters can specify the number of data packets that can be held by the buffer and/or a limitation on the volume of the buffer. The parameters can further specify a period in which the MBS data packets are buffered (e.g., the access node needs to buffer the data packets for how long).

Embodiment 3

Figure 4A:
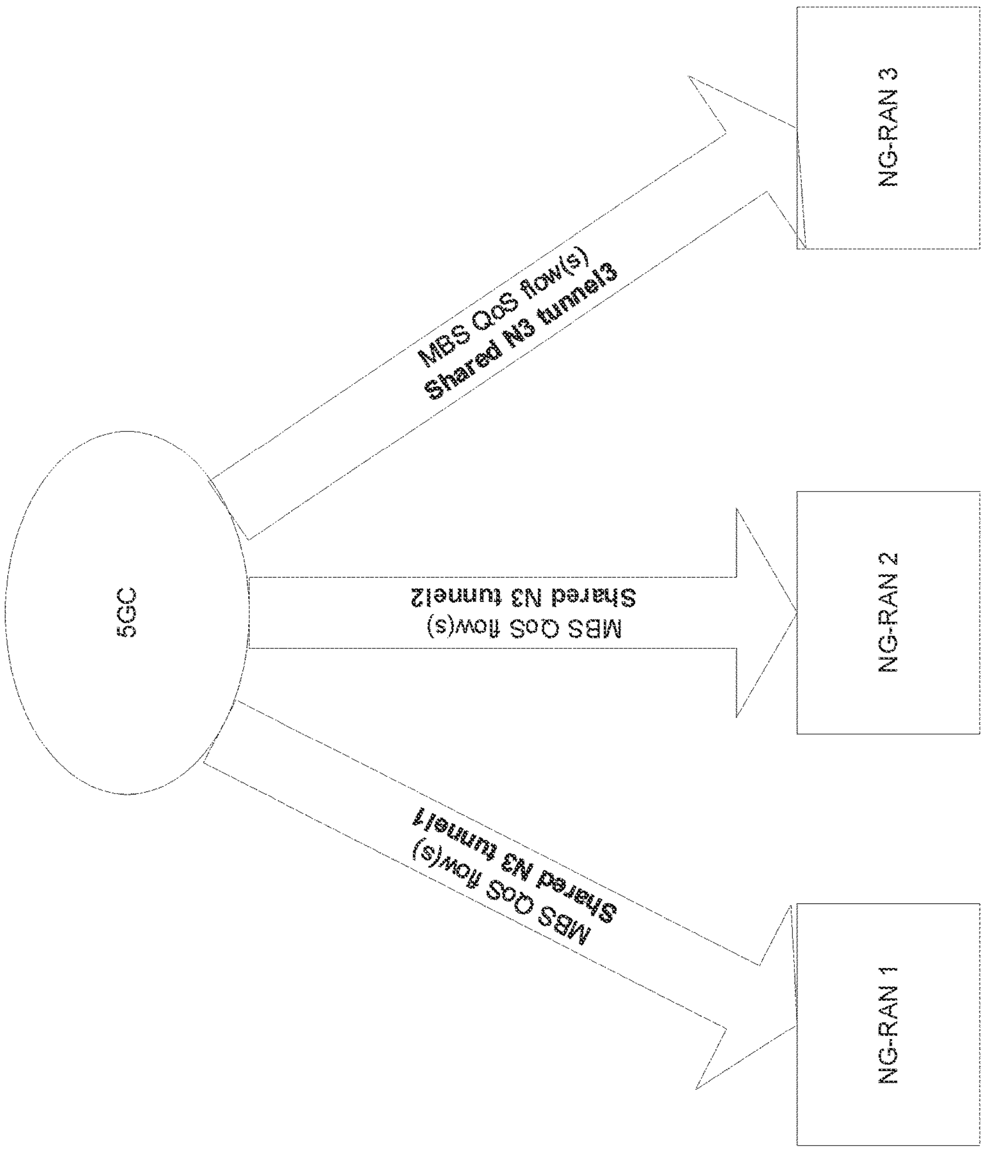
FIG. 4A illustrates an example Fifth Generation (5G) network deployment for MBS.

The 5G network has introduced different types of deployments for MBS. FIG. 4A illustrates an example 5G network deployment for MBS. As shown in FIG. 4A, the 5GC (e.g., the UPF) establishes an N3 tunnel with each NG-RAN node. A UE can camp on a cell that belongs to an NG-RANI when the network allows the UE to join an MBS service. If the MBS service has been established for the NG-RANI node, the NG-RANI node already has a multicast/shared N3 tunnel used for transmitting user data for the MBS service. There is no need for the 5GC to establish the N3 tunnel again the UE. However, if the multicast/shared N3 tunnel has not been established for the NG-RANI node, the 5GC establishes the tunnel so that user data of the MBS service can be transmitted to the UE from a network node (e.g., the UPF). In this deployment, the 5GC needs to establish separate N3 tunnels for each NG-RAN node providing the MBS service.

Figure 4B:
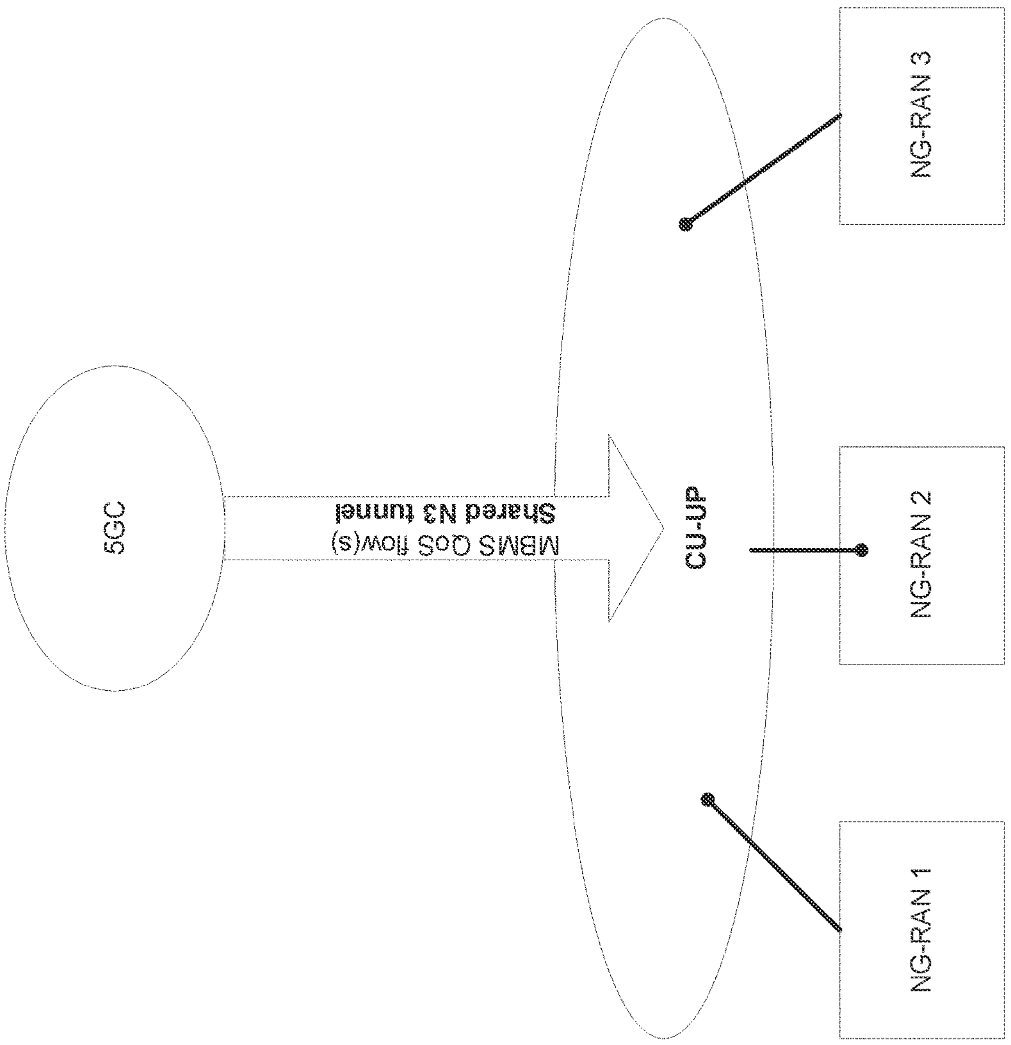
FIG. 4B illustrates another example 5G network deployment for MBS.

FIG. 4B illustrates another example 5G network deployment for MBS. Here, the NG-RAN node is split into two parts: a Central Unit (CU) and a Distributed Unit (DU). The CU can be further divided into two parts: Control Plane (CP) CU and User Plane (UP) CU. CU/DU split and CP/UP separation are adopted in this deployment such that NG-RAN nodes share the user plane resources. Only one N3 tunnel is needed between the 5GC (e.g., the UPF) and the NG-RAN nodes. If the multicast/shared N3 tunnel has been established for one NG-RAN node (e.g., NG-RAN 1), there is no need to re-establish additional N3 tunnel for other NR-RAN nodes.

Figure 5:
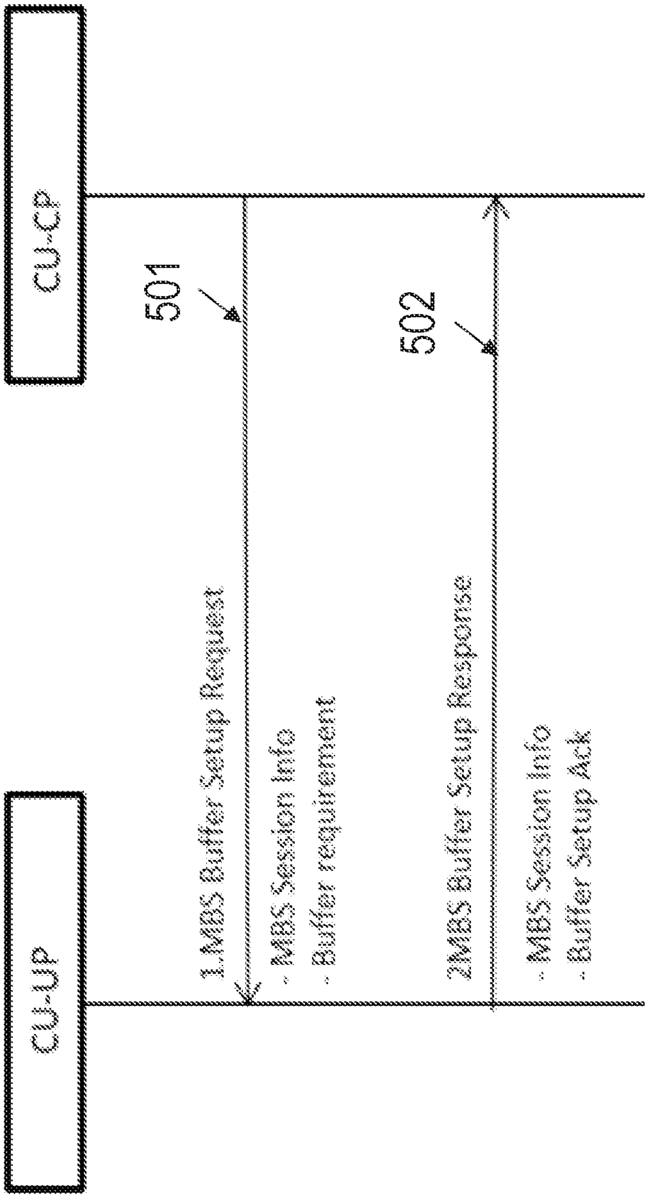
FIG. 5 is an example sequence chart of signaling messages between Central Unit (CU)-User Plane (UP) and CU-Control Plane (CP) in accordance with one or more embodiments of the present technology.

In the CU/DU split and CP/UP separation deployment scenario, the NG-RAN node can setup the buffer at the CU-UP side. In some embodiments, one MBS buffer is established for one MBS session in one shared CU-UP. FIG. 5 is an example sequence chart of signaling messages between CU-UP and CU-CP in accordance with one or more embodiments of the present technology.

Operation 501: The CU-CP transmits a E1 message (e.g., MBS buffer setup request message) to the CU-UP. The message can include one or more of the following parameters for the buffer: MBS session information (such as MBS session identifier (ID) and/or MBS priority) and/or buffer requirements (such as a size limitation of the buffer, a number of MBS data packets that can be stored in the buffer, and/or a periodicity associated with storing MBS data packets).

Operation 502, After the CU-UP receives the message, it establishes an MBS buffer according to the parameters in the message to completely fulfill the requirements for the MBS session. The CU-UP then transmits a E1 response message (e.g., MBS buffer setup response message) to the CU-CP. The response message can include the MBS session information (e.g., MBS session ID) as well as the actual parameters for the established buffer. The response message can also include an indicator indicating that the buffer setup has completed successfully.

When a handover occurs between nodes that support MBS, the UE can continue to receive the MBS data packets in a proper order via the target NG-RAN nodes even if when source and target nodes may be transmitting different MBS data. To facilitate the ordering and re-ordering of the data packets, a unique serial number can be used for each MBS data packet. The serial number can be existing number (e.g., Packet Data Convergence Protocol, PDCP, packet number) or other newly or previously defined serial number. For each MBS session, the MBS packet with the same serial number includes the same MBS data.

Figure 6:
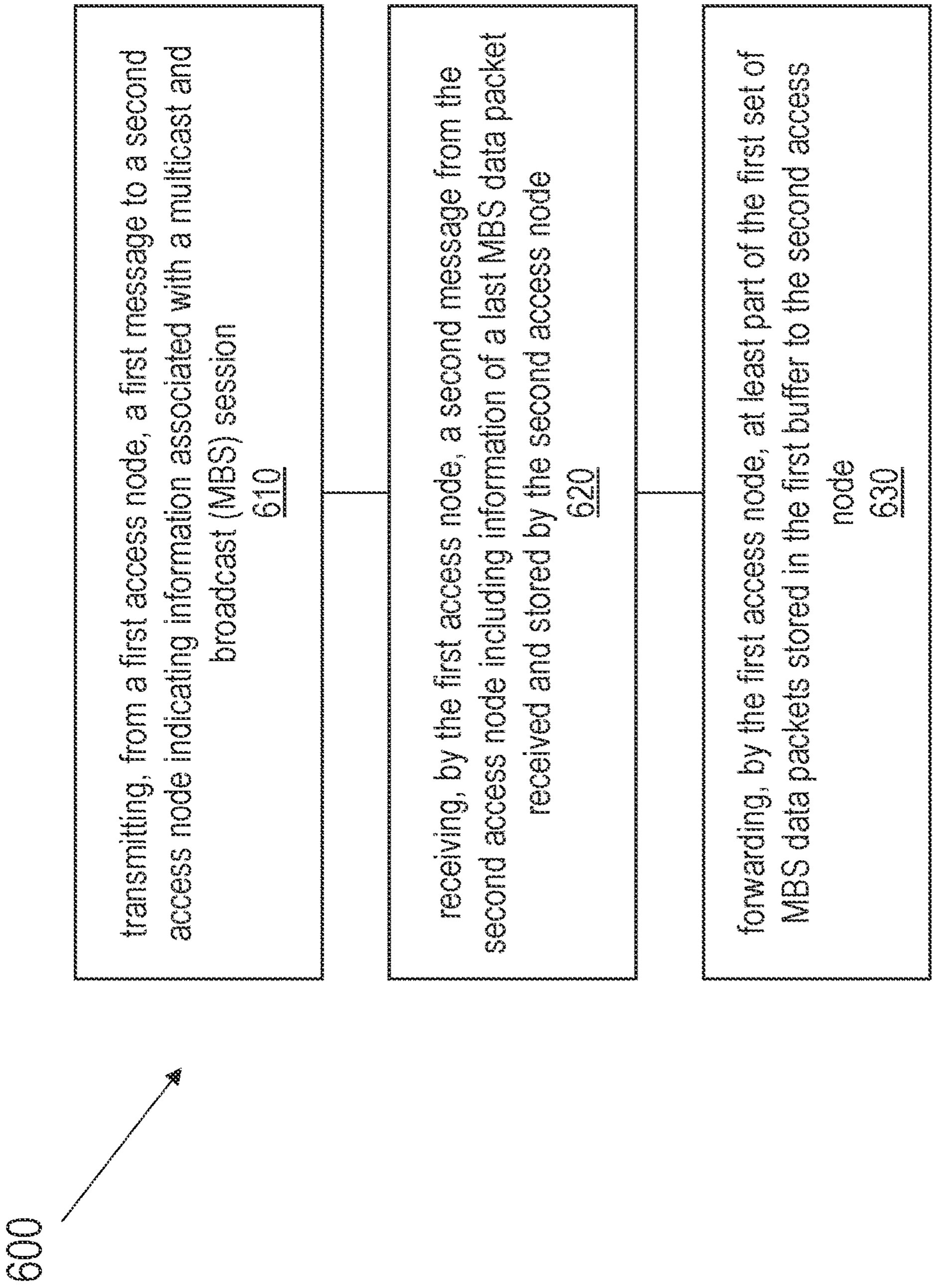
FIG. 6 is a flowchart representation of another method for wireless communications in accordance with one or more embodiments of the present technology.

FIG. 6 is a flowchart representation of a method 600 for wireless communications in accordance with one or more embodiments of the present technology. A second set of preferred solutions may include the following (e.g., as described with reference to Embodiments 4 to 5).

The method 600 includes, at operation 610, transmitting, from a first access node (e.g., a source node in a handover), a first message to a second access node (e.g., a target node in the handover) indicating information associated with a multicast and broadcast (MBS) session. The first access node is configured to store a first set of MBS data packets received from a core network in a first buffer, and the second access node is configured to store a second set of MBS data packets received from the core network in a second buffer. The first message includes information of a last MBS data packet received and stored by the first access node. The method 600 includes, at operation 620, receiving, by the first access node, a second message from the second access node. The second message includes information of a last MBS data packet received and stored by the second access node. The method 600 includes, at operation 630, forwarding, by the first access node, at least part of the first set of MBS data packets stored in the first buffer to the second access node.

In some embodiments, each of the first set and the second set of MBS data packets is associated with a unique sequence number. The method further comprises re-ordering, by the first access node, the first set of MBS data packets according to the respective unique sequence number, and transmitting, by the first access node, the at least part of the first set of MBS data packets based on the reordered MBS data packets. In some embodiments, the first message further comprises at least an identifier of the MBS session, information about a shared tunnel via which the first access node receives the first set of MBS data packets, Quality of Service information associated with the MBS session. In some embodiments, the second message further comprises at least an identifier of the MBS session, information about a shared tunnel via which the first access node receives the first set of MBS data packets, Quality of Service information associated with the MBS session.

Figure 7:
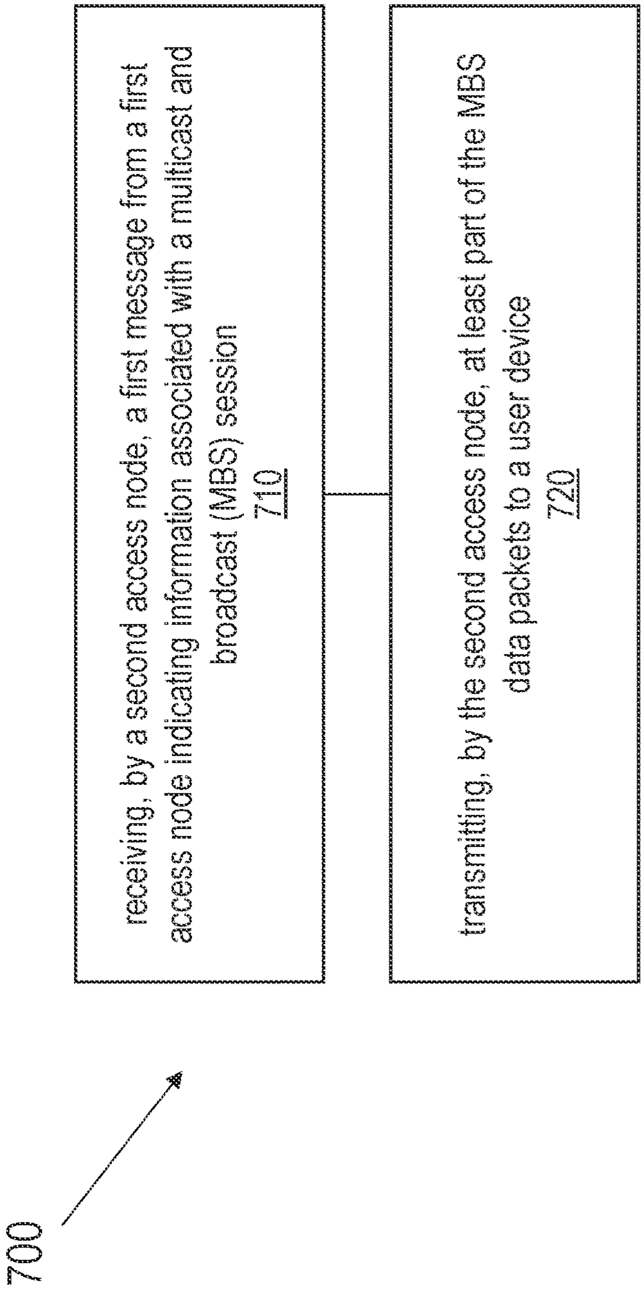
FIG. 7 is a flowchart representation of yet another method for wireless communications in accordance with one or more embodiments of the present technology.

FIG. 7 is a flowchart representation of a method 700 for wireless communications in accordance with one or more embodiments of the present technology. A third set of preferred solutions may include the following (e.g., as described with reference to Embodiments 4 to 5).

The method 700 includes, at operation 710, receiving, by a second access node (e.g., a target node in a handover), a first message from a first access node (e.g., a source node in the handover) indicating information associated with a multicast and broadcast (MBS) session. The first access node stores a first set of MBS data packets received from a core network in a first buffer, and the second access node stores a second set of MBS data packets received from the core network in a second buffer. Each of the first set and the second set of MBS data packets is associated with a unique sequence number, and the first message includes information of a last MBS data packet received and stored by the first access node. The method 700 also includes, at operation 720, transmitting, by the second access node, at least part of the first set and/or the second of MBS data packets to a user device.

In some embodiments, the method includes transmitting, by the second access node, a second message to the first access node. The second message includes information of a last MBS data packet received and stored by the second access node. In some embodiments, the method includes receiving, by the second access node, at least part of the first set of MBS data packets from the first access node prior to transmitting the MBS data packets to the user device.

In some embodiments, the method includes reordering, by the second access node, the second set of MBS data packets and the received MBS data packets according to the respective unique sequence number. In some embodiments, the method includes transmitting, by the second access node, a request message to the core network after reordering the MBS data packets. The request message includes information of a last MBS data packet of the reordered MBS data packets in the second buffer. The method also includes receiving, by the second access node, a response message from the core network acknowledging subsequent transmissions of MBS data packets with sequence numbers greater than the sequence number of the last MBS data packet.

Some examples of the disclosed techniques are further described in the following example embodiments.

Embodiment 4

Figure 8:
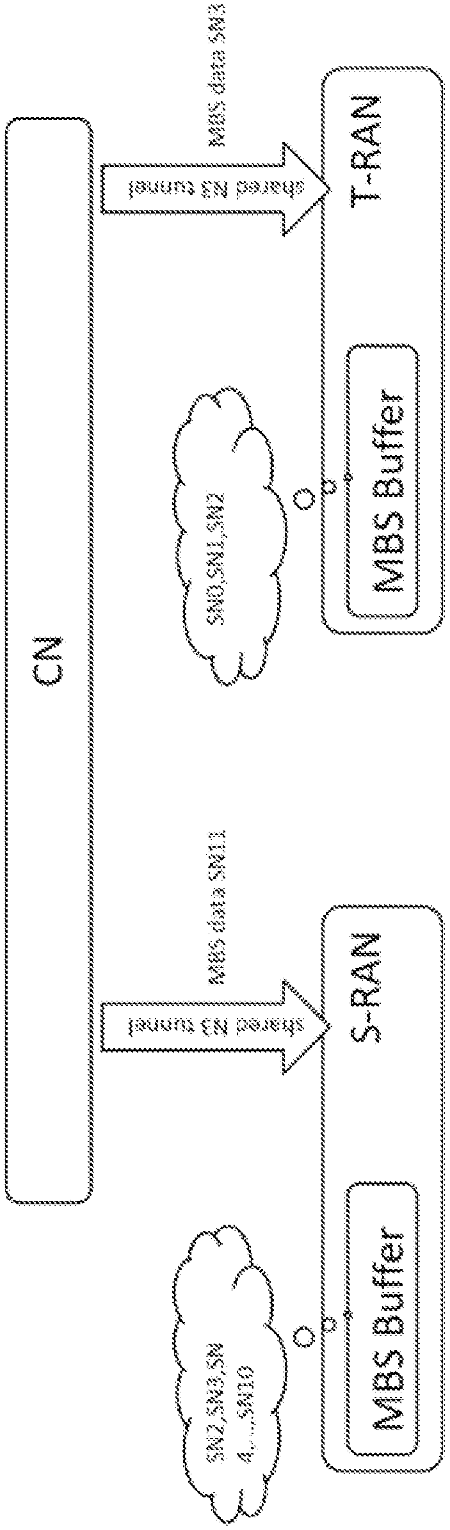
FIG. 8 illustrates an example scenario of a Source RAN (S-RAN) and a Target RAN (T-RAN) in accordance with one or more embodiments of the present technology.

FIG. 8 illustrates an example scenario of a Source NG-RAN (S-RAN) and a Target NG-RAN (T-RAN) in accordance with one or more embodiments of the present technology. In this example, both the S-RAN and the T-RAN support MBS. The MBS data transmissions to the S-RAN (e.g., SN2, SN3, . . . , SN10) is faster than the MBS data transmissions to the T-RAN (e.g., SN0, SN1, SN2). That is, the S-RAN has buffered more data than the T-RAN (e.g., SN3, SN4, . . . , SN10). If the UE is handed over from S-RAN to T-RAN, the additional data packets buffered by the S-RAN (e.g., SN3, SN4, . . . , SN10) need to be forwarded to the T-RAN to avoid any data loss.

Figure 9:
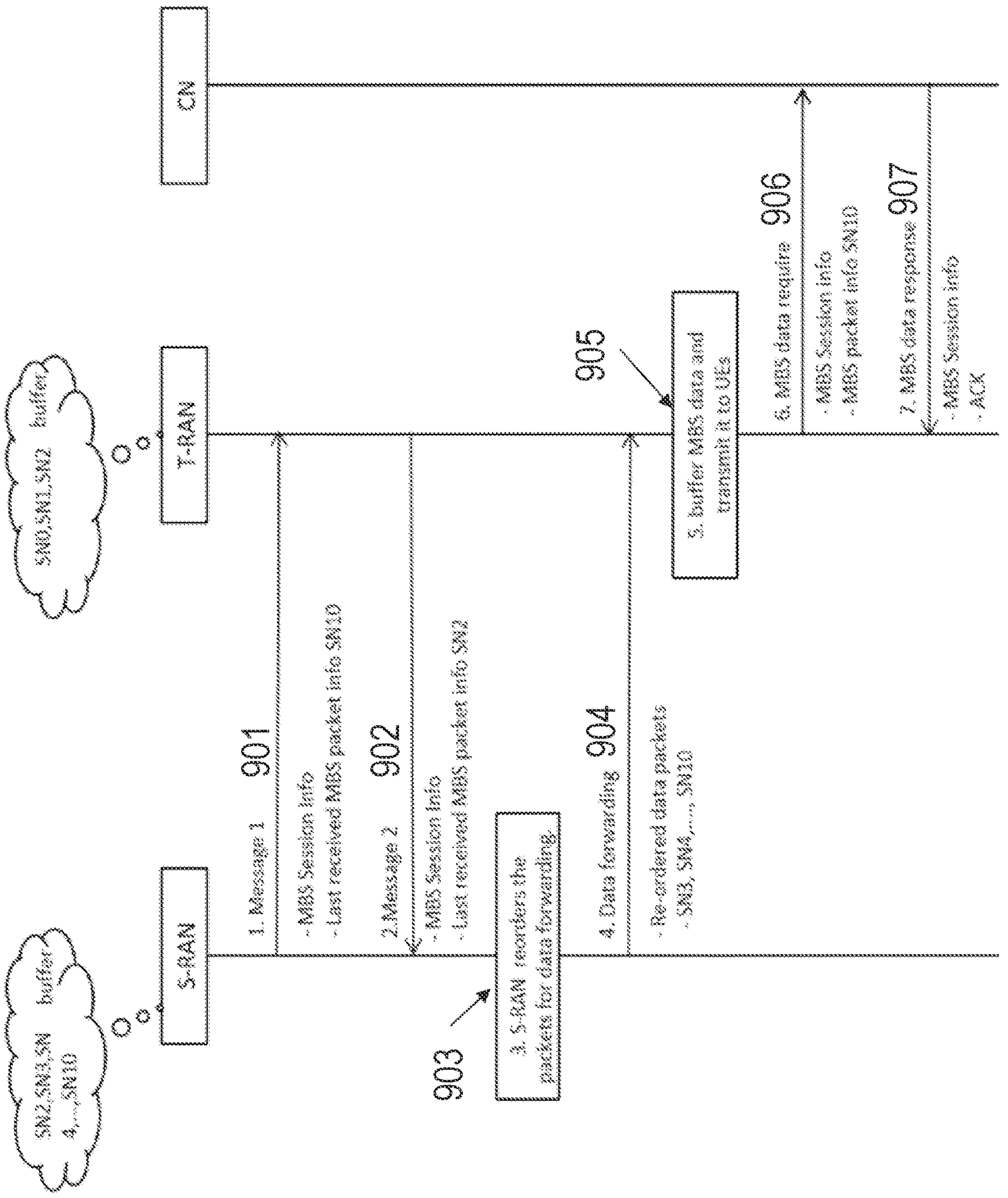
FIG. 9 an example sequence chart of signaling messages between the S-RAN, the T-RAN, and the CN in accordance with one or more embodiments of the present technology.

FIG. 9 an example sequence chart of signaling messages between the S-RAN, the T-RAN, and the CN in accordance with one or more embodiments of the present technology. In this example, both the S-RAN and the T-RAN support MBS. The S-RAN stores MBS data packet #SN2, SN3, SN4, . . . SN10 in its buffer. The T-RAN stores MBS data packet #SN0, SN1, SN2 in its buffer. A UE that camps in the S-RAN and receives MBS data is going to be handed over to the T-RAN.

Operation 901: The S-RAN transmits a request message (e.g., Xn message Handover Request, or NG message Handover Required and/or Handover Request, etc.) to the T-RAN. The request message includes one or more of the following: MBS session information (such as MBS session ID, MBS area scope information, N3 tunnel information such as tunnel ID, tunnel address, tunnel endpoint identifiers, associated QoS information, etc.) and/or information about the last received MBS packet in the buffer (e.g., information about packet SN10).

Operation 902: The T-RAN receives the request message and determines that it has never received SN10. Hence, the T-RAN transmits a response message (e.g., Xn message Handover Request Acknowledgement or NG message Handover Request Acknowledgement and/or Handover Command, etc.) to the S-RAN. The response message includes one or more of the following: MBS session information (such as MBS session ID, MBS area scope information, N3 tunnel information such as tunnel ID, tunnel address, tunnel endpoint identifiers, associated QoS information, etc.) and/or information about the last received MBS packet in the buffer (e.g., information about packet SN2).

Operation 903: The S-RAN examines the information about the received MBS packet SN (e.g., SN2) and reorders the buffered MBS data packets that are going to be transmitted to T-RAN (e.g., from SN3 to SN10). As the T-RAN has received SN1 and SN2, only packets SN3 to SN10 need to be forwarded to the T-RAN.

Operation 904: The S-RAN forwards the re-ordered MBS data to T-RAN.

Operation 905: After the T-RAN receives the forwarded MBS data, it stores the received data into the buffer. The T-RAN can transmit all data to its camped UEs that are using this MBS session. Depending on the parameters of the T-RAN's buffer, in some embodiments, not all of the forwarded MBS data can be stored in the buffer. The T-RAN can start to transmit part of the stored packets to the UEs, or adopt other means (e.g., an additional temporary buffer) to ensure that all data packets can be forwarded to the UEs for data lossless handovers.

Operation 906: After the T-RAN receives the reordered MBS data packets from S-RAN, T-RAN transmits a message (e.g., MBS data require message) to the CN. The message includes one or more of the following: MBS session information (such as MBS session ID, MBS area scope information, N3 tunnel information such as tunnel ID, tunnel address, tunnel endpoint identifiers, associated QoS information, etc.) and/or information about the last received MBS packet in the buffer (e.g., information about packet SN10).

Operation 907: After the CN receives the MBS data require message, the CN learns that T-RAN has already received the MBS data packets with the SN before SN10. CN transmits a response message (e.g., MBS data response message) to the T-RAN. The response message includes one or more of the following: MBS session information (such as MBS session ID, MBS area scope information, N3 tunnel information such as tunnel ID, tunnel address, tunnel endpoint identifiers, associated QoS information, etc.) and/or acknowledgement (e.g., a one-bit indication) indicating that subsequent transmissions will be based on the information provided by the T-RAN. The CN can then skip transmissions of the MBS data packets between SN3 and SN10. The next MBS data packet transmits from the CN to the T-RAN will be SN11.

Embodiment 5

Figure 10:
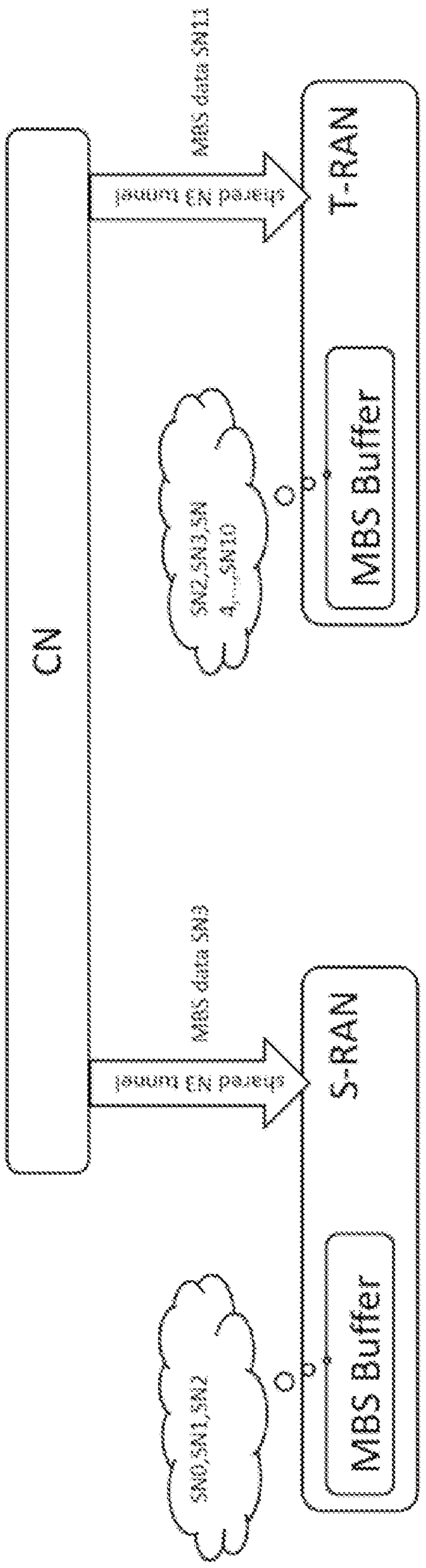
FIG. 10 illustrates another example scenario of a S-RAN and a T-RAN in accordance with one or more embodiments of the present technology.

FIG. 10 illustrates another example scenario of a S-RAN and a T-RAN in accordance with one or more embodiments of the present technology. In this example, both the S-RAN and the T-RAN support MBS. The MBS data transmissions to the S-RAN (e.g., SN0, SN1, SN2) is slower than the MBS data transmissions to the T-RAN (e.g., SN2, SN3, SN4, . . . , SN10). That is, the T-RAN has buffered more data than the S-RAN (e.g., SN3, SN4, . . . , SN10). If the UE is handed over from S-RAN to T-RAN, the additional data packets buffered by the T-RAN (e.g., SN3, SN4, . . . , SN10) need to be accounted for to avoid any data loss.

Figure 11:
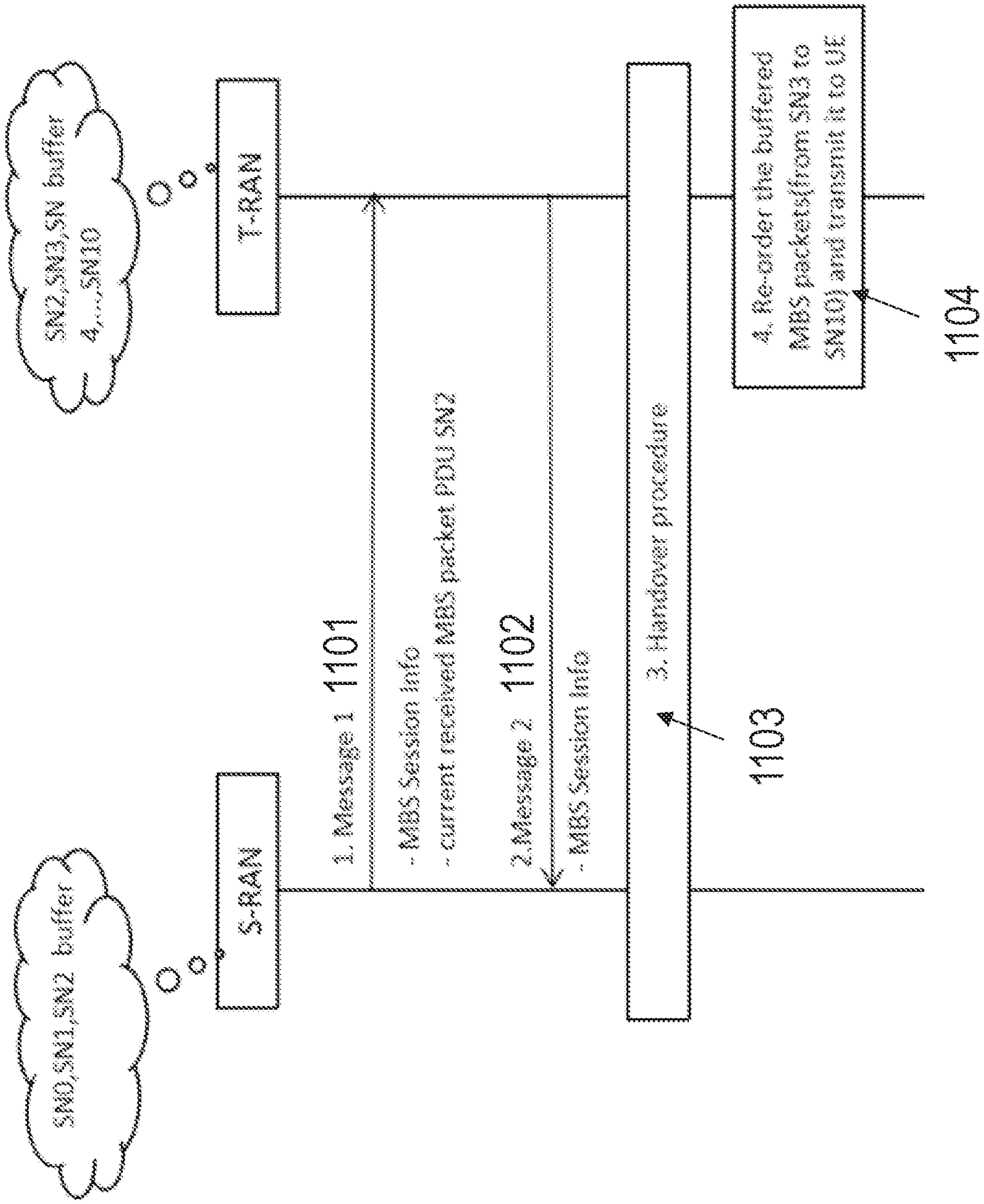
FIG. 11 an example sequence chart of signaling messages between the S-RAN and the T-RAN in accordance with one or more embodiments of the present technology.

FIG. 11 an example sequence chart of signaling messages between the S-RAN and the T-RAN in accordance with one or more embodiments of the present technology. In this example, both the S-RAN and the T-RAN support MBS. The S-RAN stores MBS data packet #SN0, SN1, SN2 in its buffer. The T-RAN stores MBS data packet #SN2, SN3, SN4, . . . , SN10 in its buffer. A UE that camps in the S-RAN and receives MBS data is going to be handed over to the T-RAN.

Operation 1101: The S-RAN transmits a request message (e.g., Xn message Handover Request, or NG message Handover Required and/or Handover Request, etc.) to the T-RAN. The request message includes one or more of the following: MBS session information (such as MBS session ID, MBS area scope information, N3 tunnel information such as tunnel ID, tunnel address, tunnel endpoint identifiers, associated QoS information, etc.) and/or information about the last received MBS packet in the buffer (e.g., information about packet SN2).

Operation 1102: The T-RAN receives the request message and determines that it has never received SN10. Hence, the T-RAN transmits a response message (e.g., Xn message Handover Request Acknowledgement or NG message Handover Request Acknowledgement and/or Handover Command, etc.) to the S-RAN. The response message includes one or more of the following: MBS session information (such as MBS session ID, MBS area scope information, N3 tunnel information such as tunnel ID, tunnel address, tunnel endpoint identifiers, associated QoS information, etc.).

Operation 1103: The S-RAN receives the response and determines that the response does not include any information regarding the MBS packet(s) of the T-RAN. The S-RAN then knows that no MBS packet needs to be forwarded to T-RAN. The S-RAN the performs handover procedure.

Operation 1104: After the UE camps on the T-RAN, the T-RAN re-orders the buffered MBS data packets (from SN3 to SN10) and transmits the packets to the UE. As the S-RAN has received SN1 and SN2 and forwarded to the UEs, only packets SN3 to SN10 need to be forwarded to the UEs at this point.

Figure 12:
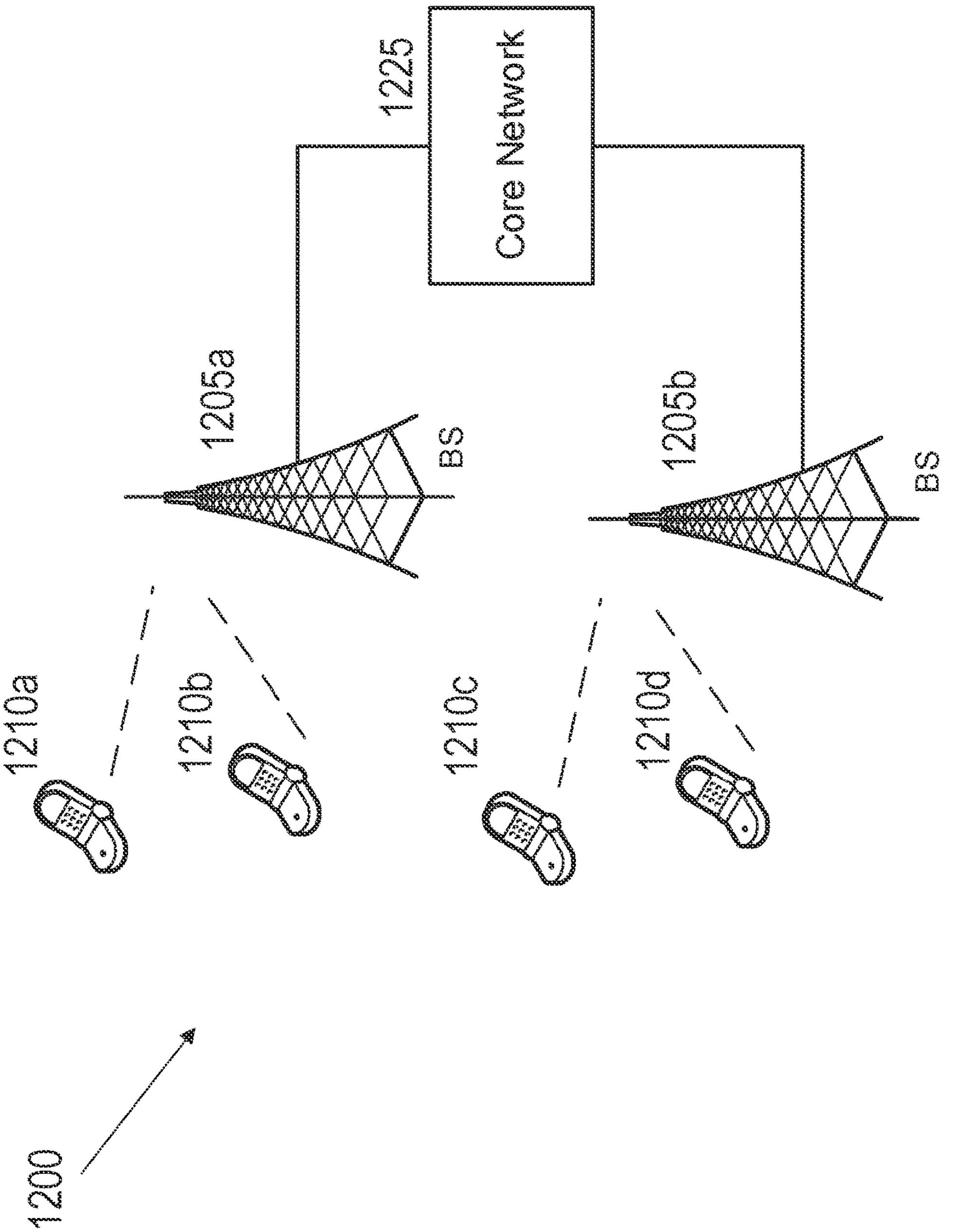
FIG. 12 shows an example of a wireless communication system where techniques in accordance with one or more embodiments of the present technology can be applied.

FIG. 12 shows an example of a wireless communication system 1200 where techniques in accordance with one or more embodiments of the present technology can be applied. A wireless communication system 1200 can include one or more base stations (BSs) 1205*a*, 1205*b*, one or more wireless devices 1210*a*, 1210*b*, 1210*c*, 1210*d*, and a core network 1225. A base station 1205*a*, 1205*b* can provide wireless service to wireless devices 1210*a*, 1210*b*, 1210*c* and 1210*d* in one or more wireless sectors. In some implementations, a base station 1205*a*, 1205*b* includes directional antennas to produce two or more directional beams to provide wireless coverage in different sectors. The core network 1225 can communicate with one or more base stations 1205*a*, 1205*b*. The core network 1225 provides connectivity with other wireless communication systems and wired communication systems. The core network may include one or more service subscription databases to store information related to the subscribed wireless devices 1210*a*, 1210*b*, 1210*c*, and 1210*d*. A first base station 1205*a* can provide wireless service based on a first radio access technology, whereas a second base station 1205*b* can provide wireless service based on a second radio access technology. The base stations 1205*a* and 1205*b* may be co-located or may be separately installed in the field according to the deployment scenario. The wireless devices 1210*a*, 1210*b*, 1210*c*, and 1210*d* can support multiple different radio access technologies. The techniques and embodiments described in the present document may be implemented by the base stations of wireless devices described in the present document.

Figure 13:
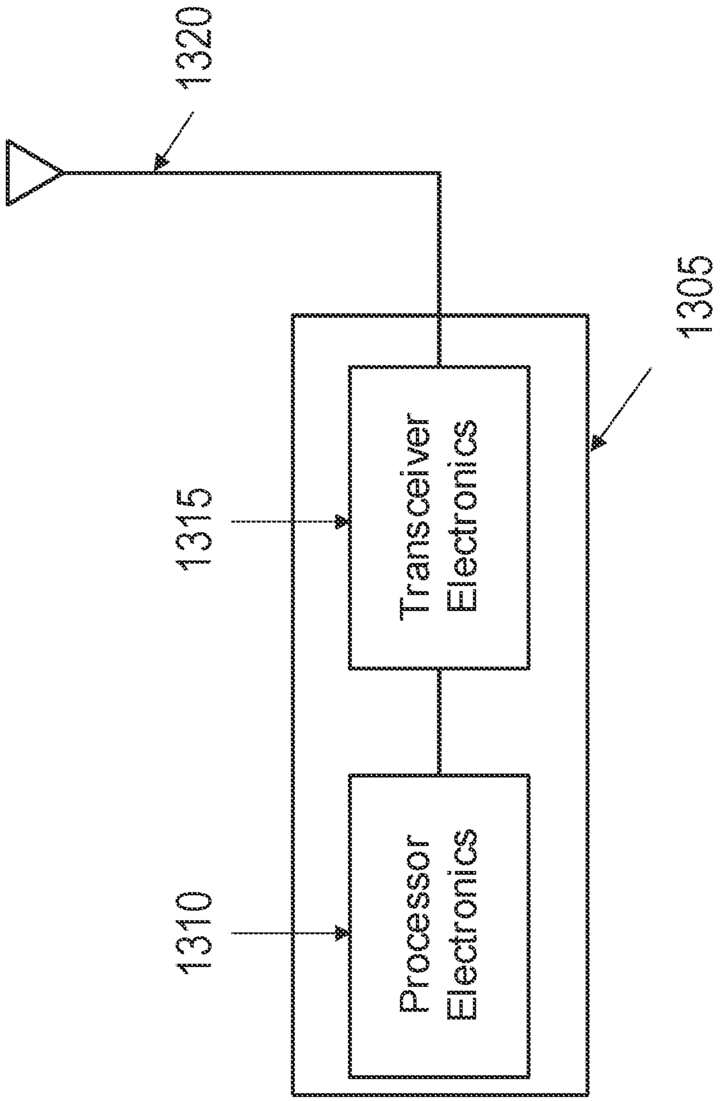
FIG. 13 is a block diagram representation of a portion of a radio station in accordance with one or more embodiments of the present technology can be applied.

FIG. 13 is a block diagram representation of a portion of a radio station in accordance with one or more embodiments of the present technology can be applied. A radio station 1305 such as a network node, a base station, or a wireless device (or UE) can include processor electronics 1310 such as a microprocessor that implements one or more of the wireless techniques presented in this document. The radio station 1305 can include transceiver electronics 1315 to send and/or receive wireless signals over one or more communication interfaces such as antenna 1320. The radio station 1305 can include other communication interfaces for transmitting and receiving data. Radio station 1305 can include one or more memories (not explicitly shown) configured to store information such as data and/or instructions. In some implementations, the processor electronics 1310 can include at least a portion of the transceiver electronics 1315. In some embodiments, at least some of the disclosed techniques, modules or functions are implemented using the radio station 1305. In some embodiments, the radio station 1305 may be configured to perform the methods described herein.

It will be appreciated that the present document discloses techniques that can be embodied in various embodiments to ensure lossless MBS data transmissions in different handover scenarios. The disclosed techniques can be used in different handover scenarios, depending on the information associated with the T-RAN that is known to the S-RAN. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communications, comprising:

transmitting, from a first access node, a first message to a second access node indicating information associated with a multicast and broadcast (MBS) session, wherein the first access node is configured to store a first set of MBS data packets received from a core network in a first buffer, wherein the second access node is configured to store a second set of MBS data packets received from the core network in a second buffer, and wherein the first message includes information of a last MBS data packet received and stored by the first access node, receiving, by the first access node, a second message from the second access node, wherein the second message includes information of a last MBS data packet received and stored by the second access node, forwarding, by the first access node, at least part of the first set of MBS data packets stored in the first buffer to the second access node.

2. The method of claim 1, wherein each of the first set and the second set of MBS data packets is associated with a unique sequence number, and wherein the method further comprises:

reordering, by the first access node, the first set of MBS data packets according to a respective unique sequence number, and transmitting, by the first access node, the at least part of the first set of MBS data packets based on reordered MBS data packets.

3. The method of claim 1, wherein the first message further comprises at least an identifier of the MBS session, information about a shared tunnel via which the first access node receives the first set of MBS data packets, Quality of Service information associated with the MBS session.

4. The method of claim 1, wherein the second message further comprises at least an identifier of the MBS session, information about a shared tunnel via which the first access node receives the first set of MBS data packets, Quality of Service information associated with the MBS session.

5. A method for wireless communication, comprising:

receiving, by a second access node, a first message from a first access node indicating information associated with a multicast and broadcast (MBS) session, wherein the first access node stores a first set of MBS data packets received from a core network in a first buffer, wherein the second access node stores a second set of MBS data packets received from the core network in a second buffer, wherein each of the first set and the second set of MBS data packets is associated with a unique sequence number, and wherein the first message includes information of a last MBS data packet received and stored by the first access node, and transmitting, by the second access node, at least part of the first set and/or the second set of MBS data packets to a user device.

6. The method of claim 5, further comprising:

transmitting, by the second access node, a second message to the first access node, wherein the second message includes information of a last MBS data packet received and stored by the second access node.

7. The method of claim 5, further comprising:

receiving, by the second access node, at least part of the first set of MBS data packets from the first access node prior to transmitting MBS data packets to the user device.

8. The method of claim 5, further comprising:

reordering, by the second access node, the second set of MBS data packets and received MBS data packets according to a respective unique sequence number.

9. The method of claim 8, further comprising:

transmitting, by the second access node, a request message to the core network after reordering the received MBS data packets, wherein the request message includes information of a last MBS data packet of reordered MBS data packets in the second buffer, and receiving, by the second access node, a response message from the core network acknowledging subsequent transmissions of MBS data packets with sequence numbers greater than a sequence number of the last MBS data packet.

10. An apparatus for wireless communication comprising:

one or more processors configured to:

transmit, from a first access node, a first message to a second access node indicating information associated with a multicast and broadcast (MBS) session, wherein the first access node is configured to store a first set of MBS data packets received from a core network in a first buffer, wherein the second access node is configured to store a second set of MBS data packets received from the core network in a second buffer, and wherein the first message includes information of a last MBS data packet received and stored by the first access node;

receive, by the first access node, a second message from the second access node, wherein the second message includes information of a last MBS data packet received and stored by the second access node; and forward, by the first access node, at least part of the first set of MBS data packets stored in the first buffer to the second access node.

11. An apparatus for wireless communication comprising: one or more processors configured to:

receive, by a second access node, a first message from a first access node indicating information associated with a multicast and broadcast (MBS) session, wherein the first access node stores a first set of MBS data packets received from a core network in a first buffer, wherein the second access node stores a second set of MBS data packets received from the core network in a second buffer, wherein each of the first set and the second set of MBS data packets is associated with a unique sequence number, and wherein the first message includes information of a last MBS data packet received and stored by the first access node; and transmit, by the second access node, at least part of the first set and/or the second set of MBS data packets to a user device.

12. The apparatus of claim 10, wherein each of the first set and the second set of MBS data packets is associated with a unique sequence number, and wherein the one or more processors are further configured to:

reorder, by the first access node, the first set of MBS data packets according to a respective unique sequence number, and transmit, by the first access node, the at least part of the first set of MBS data packets based on reordered MBS data packets.

13. The apparatus of claim 10, wherein the first message further comprises at least an identifier of the MBS session, information about a shared tunnel via which the first access node receives the first set of MBS data packets, Quality of Service information associated with the MBS session.

14. The apparatus of claim 10, wherein the second message further comprises at least an identifier of the MBS session, information about a shared tunnel via which the first access node receives the first set of MBS data packets, Quality of Service information associated with the MBS session.

15. The apparatus of claim 11, wherein the one or more processors are further configured to:

transmit, by the second access node, a second message to the first access node, wherein the second message includes information of a last MBS data packet received and stored by the second access node.

16. The apparatus of claim 11, wherein the one or more processors are further configured to:

receive, by the second access node, at least part of the first set of MBS data packets from the first access node prior to transmitting MBS data packets to the user device.

17. The apparatus of claim 11, wherein the one or more processors are further configured to:

reorder, by the second access node, the second set of MBS data packets and received MBS data packets according to a respective unique sequence number.

18. The apparatus of claim 11, wherein the one or more processors are further configured to:

transmit, by the second access node, a request message to the core network after reordering the received MBS data packets, wherein the request message includes information of a last MBS data packet of reordered MBS data packets in the second buffer, and receive, by the second access node, a response message from the core network acknowledging subsequent transmissions of MBS data packets with sequence numbers greater than a sequence number of the last MBS data packet.

* * * * *